US012743183B2

(12) United States Patent
Thien

(10) Patent No.: US 12,743,183 B2
(45) Date of Patent: Sep. 22, 2026

(54) DYNAMIC FOCUSING/DEFOCUSING OF PICTURE-IN-PICTURE WINDOW

(71) Applicant: DELL PRODUCTS L.P., Round Rock, TX (US)

(72) Inventor: Vui Khen Thien, Singapore (SG)

(73) Assignee: Dell Products L.P., Round Rock, TX (US)

( * ) Notice: Subject to any disclaimer, the term of this patent is extended or adjusted under 35 U.S.C. 154(b) by 164 days.

(21) Appl. No.: 18/514,074

(22) Filed: Nov. 20, 2023

(65) Prior Publication Data

US 2025/0165114 A1 May 22, 2025

(51) Int. Cl.
*G06F 3/0481* (2022.01)
*G06F 3/0484* (2022.01)

(52) U.S. Cl.
CPC .......... *G06F 3/0481* (2013.01); *G06F 3/0484* (2013.01); *G06F 2203/04803* (2013.01); *G06F 2203/04804* (2013.01)

(58) Field of Classification Search
CPC ................. G06F 3/0481; G06F 3/0484; G06F 2203/04803; G06F 2203/04804
See application file for complete search history.

(56) References Cited

U.S. PATENT DOCUMENTS 10,712,940 B2 * 7/2020 Harada .................. G05B 15/02
11,657,778 B2 5/2023 Xiong et al.
2002/0069411 A1 * 6/2002 Rainville ........... H04N 5/44504 725/110
2002/0070957 A1 * 6/2002 Trajkovic ................. H04N 5/45 348/E9.037
2002/0071031 A1 * 6/2002 Lord .................. G08B 21/0294 348/143
2002/0075407 A1 * 6/2002 Cohen-Solal .... H04N 21/44008 348/565
2003/0142109 A1 * 7/2003 Brown .................. G06F 3/0481 345/592
2005/0155052 A1 * 7/2005 Ostrowska ......... H04N 21/4755 348/E7.071
2006/0218581 A1 * 9/2006 Ostrowska ......... H04N 21/4314 348/E7.071
2008/0088744 A1 * 4/2008 Lee ........................ H04N 21/47 348/588
2008/0291327 A1 * 11/2008 Jin ........................... H04N 5/45 348/565
2012/0092438 A1 * 4/2012 Guzman Suarez ...... H04N 7/15 348/E7.083
2012/0098852 A1 * 4/2012 Kuribayashi ........ H04N 9/3179 345/592
2018/0275814 A1 * 9/2018 Hosokawa ................ G06F 3/14
2018/0314617 A1 11/2018 Khosrowpour et al.
2022/0101814 A1 * 3/2022 Patel ...................... G09G 5/363
2022/0374136 A1 * 11/2022 Chang ................. G06F 3/04845
2023/0350501 A1 11/2023 Yong et al.

* cited by examiner

*Primary Examiner* — William L Bashore
*Assistant Examiner* — Gregory A Distefano
(74) *Attorney, Agent, or Firm* — Larson Newman, LLP

(57) ABSTRACT

A system monitors an information handling system to detect an event associated with a picture-in-picture window. In response to detecting the event, the system determines a new state of the picture-in-picture window based on the event and a current state of the picture-in-picture window, and applies configuration settings to the picture-in-picture window based on the new state.

17 Claims, 7 Drawing Sheets

200
Display Panel 210
Primary Window 215
PIP Window 220
205
Frame Buffer Memory 222
Display Controller 225
280
Client 230
Hub 270
Client 240
HID 250
HID 260

300
Display Panel 210
PIP Window 320
Primary Window 315
205
Frame Buffer Memory 222
Display Controller 225
Video
Video
280
Client 230
Data
Hub 270
Data
Client 240
HID 250
HID 260

800

| Connector Type | Previous State | New State | PIP Window Mode |
|---|---|---|---|
| DisplayPort (Pin 20) | 3.3 Volts | 0 Volts | Disable PIP Window |
| | 0 Volts | 3.3 Volts | Enable PIP Window |
| HDMI (Pin 18) | 5 Volts | 0 Volts | Disable PIP Window |
| | 0 Volts | 5 Volts | Enable PIP Window |
| USB Type-C | S0 | S0ix/S3/S4/S5 | Disable PIP Window |
| | S0ix/S3/S4/S5 | S0 | Enable PIP Window |

*FIG. 8*

DYNAMIC FOCUSING/DEFOCUSING OF PICTURE-IN-PICTURE WINDOW

FIELD OF THE DISCLOSURE

The present disclosure generally relates to information handling systems, and more particularly relates to dynamic focusing/defocusing of a picture-in-picture window.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system monitors an information handling system to detect an event associated with a picture-in-picture window. In response to detecting the event, the system determines a new state of the picture-in-picture window based on the event and a current state of the picture-in-picture window, and applies configuration settings to the picture-in-picture window based on the new state.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 8 is a table depicting a change in a picture-in-picture window's state based on a secondary client's power state, according to an embodiment of the present disclosure.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
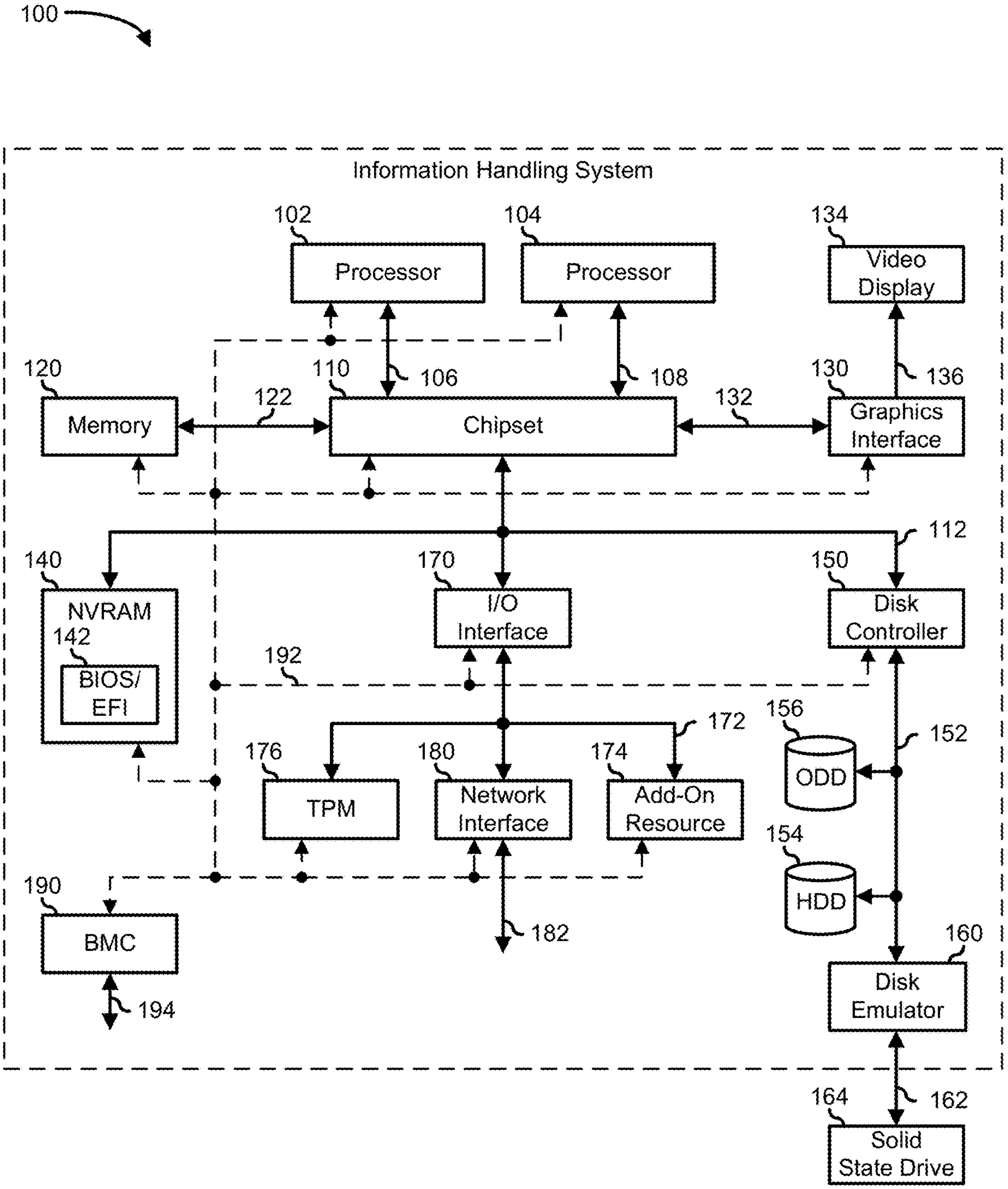
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort® interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Single display multi-client setup is becoming increasingly popular. For example an entity may require its users to employ a standard mobility platform for email, communication, and collaboration, while another computing platform may be used for graphics design. Many display monitors have a picture-in-picture (PIP) feature that allows two clients to present visual images concurrently. A user may select a primary client that is a primary video source to present visual images in a primary window and a secondary client that is a secondary video source to present visual images in a PIP window. Once a secondary visual source is selected, the PIP window will typically remain active until a user interacts with the display to manually turn off the PIP feature. The end user may use an input device, such as a mouse and/or a keyboard, to switch between the primary client and the secondary client via a keyboard, video, mouse (KVM) switch. Often the user's focus on a two-client setup is time multiplexed, where at any point in time one of the clients will receive a user's input, while the other client is either dormant or running a background task that does not require user's input until the task completes.

Typically, the PIP window may be similar in size or smaller than the primary window when using the PIP window to keep track of the background task. The size of the PIP window is generally unchanged until re-configured via an on-screen display setting. However, the user may want the PIP window to be larger when the user's focus is shifted to the background task. Typically, switching between the two sizes of the PIP window is generally not seamless. For example, the user may have to manually change the size of the picture-window using an on-screen display interface. In addition, even if the secondary client enters into a sleep or a hibernation state due to inactivity the PIP window may remain overlaid on the primary window. Because the PIP window has an opaque background, the contents of the primary window behind the PIP window are blocked from view which is inconvenient for the user. To address these and other concerns, the present disclosure provides a system and method for a more seamless switching mechanism between at least two different sizes of the PIP window.

Figure 2:
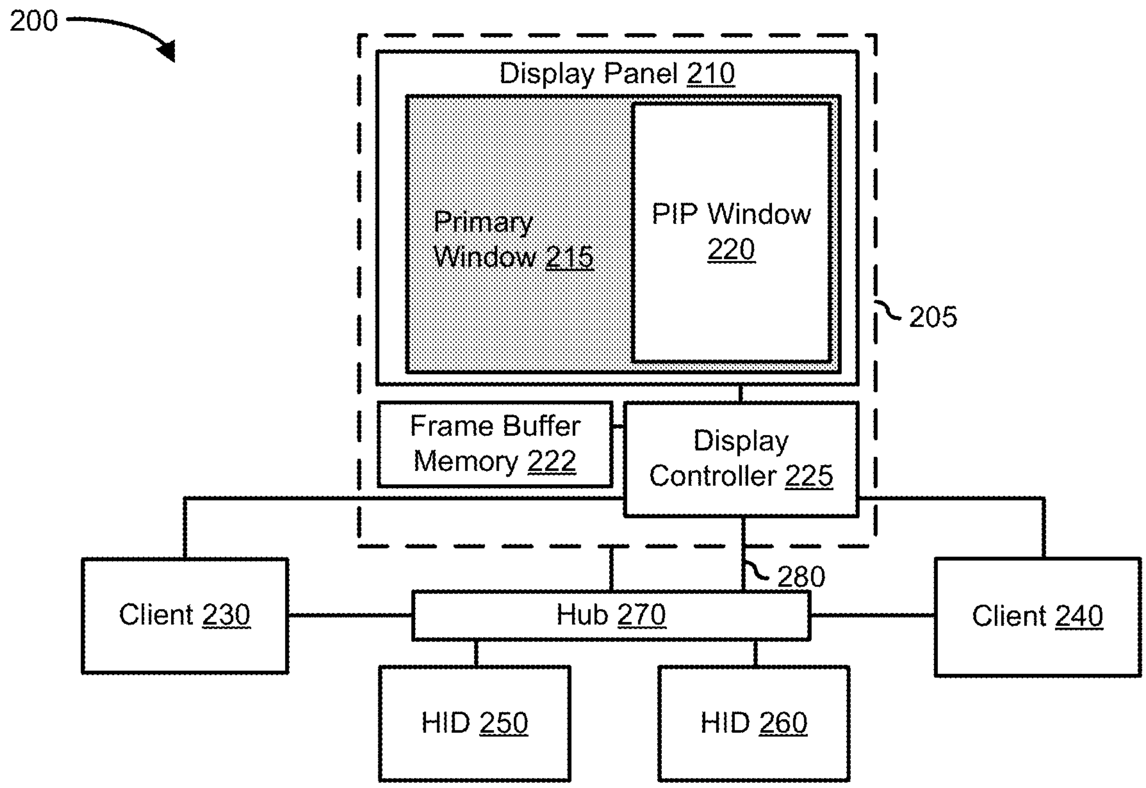
FIGS. 2-5 are block diagrams illustrating environments for dynamic focusing/defocusing of a picture-in-picture window, according to an embodiment of the present disclosure.

FIG. 2 shows an environment 200 with a PIP window in a focused mode. Environment 200 includes a display 205, clients 230 and 240, a hub 270, a human interface device (HID) 250, a HID 260, and a hub 270. Display 205 includes a display panel 210, a frame buffer memory 222, and a display controller 225. Display controller 225 is configured to support two video inputs from client 230 and client 240 and present both inputs in a primary window 215 and a PIP window 220 respectively via a frame buffer memory 222. Clients 230 and 240 may be similar to information handling system 100 of FIG. 1. In this example, client 230 may be a primary client and associated with primary window 215.

Accordingly, client 240 may be a secondary client and associated with PIP window 220. Display controller 225 is communicatively coupled to client 230, client 240, and hub 270. Hub 270 is communicatively coupled to client 230, client 240, HID 250, and HID 260. Display controller 225 and hub 270 may be integrated into a single system on chip (SoC). HID 250 and HID 260 may be a keypad, keyboard, mouse, stylus, joystick, pen, voice recognition device, or any other type of device capable of conveying input and/or output. In one example, HID 250 may be a keyboard and HID 260 may be a mouse. As such, client 230 and client 240 may transmit data to display controller via hub 270. Client 230 and client 240 may transmit video stream to display controller 225 via a DisplayPort® or HDMI interface. Although video and data are generally independent and traverse through separate physical connection, this invention may also be applied to connectivity technologies that merges video and data into one connector, such as USB Type-C, or tunneling technologies such as USB 4.0.

Hub 270 can be a hardware device that provides a connection between information handling systems and peripheral devices, such as a USB hub or a network hub. Hub 270 may include an external communication interface, such as a communication interface 280 that includes a plurality of ports, wherein each port can accept a cable that communicates data information from clients 230 and 240 to HID 250 and HID 260. For example, hub 270 may include a USB Type C port, Category V Ethernet port, and other types of ports. Hub 270 may be configured to communicatively couple or link various devices and/or report each of their presence to a display controller. For example, hub 270 may be configured to report connection status of client 230, client 240, HID 250, and HID 260 to display controller 225 via communication interface 280. In addition, hub 270 may include a multiplexer that allows a user to switch between client 230 and client 240.

Display 205, which is similar to video display 134 of FIG. 1, may be configured to support more than one video stream for presentation at display panel 210. The video stream may come from multiple inputs via display controller 225. In this example, display controller 225 of display 205 can be configured to process and scale video input from client 230 and client 240 into an image size of primary window 215 and PIP window 220 respectively and store them into frame buffer memory 222. Display controller 225 may then output the blended image from frame buffer memory 222 to display panel 210. In one example, display 205 may be an external display monitor, a television, or similar. In another example, display 205 may be integrated into one of the clients, such as client 230.

PIP window 220 may have at least one defined size resolution that a display controller may use to convert a secondary visual information source to the defined size resolution. PIP window 220 may also have at least one definable size that a user can configure via an on-screen display interface. For example, PIP window 220 may have a first-size resolution when it is in focus and a second-size resolution when the PIP window 220 is not in focus. The first size resolution and second size resolution may be customizable via an on-screen display interface. As a default configuration, the first size resolution may occupy close to or more than half of a screen area of display panel 210. The second size resolution may occupy less than a quarter of screen area of display panel 210 or completely turned off, wherein PIP window 220 may not occupy any screen area when defocused. In both the defocused mode and the focused mode, the PIP window may be overlaid on the primary window.

PIP window 220 may be automatically resized from the first size resolution to the second size resolution or vice versa based at least on an event or a combination of events. In addition, the transparency of PIP window 220 may be altered based on its size. For example, PIP window 220 may be opaque at the first size resolution and semi-transparent or transparent at the second size resolution. When PIP window 320 is in the focused mode, one or more configuration settings may be updated. For example, PIP window 320 may be resized to the first size resolution and disposed proximate to primary window 315. In addition, PIP window 320 may be configured to have an opaque background.

Figure 3:
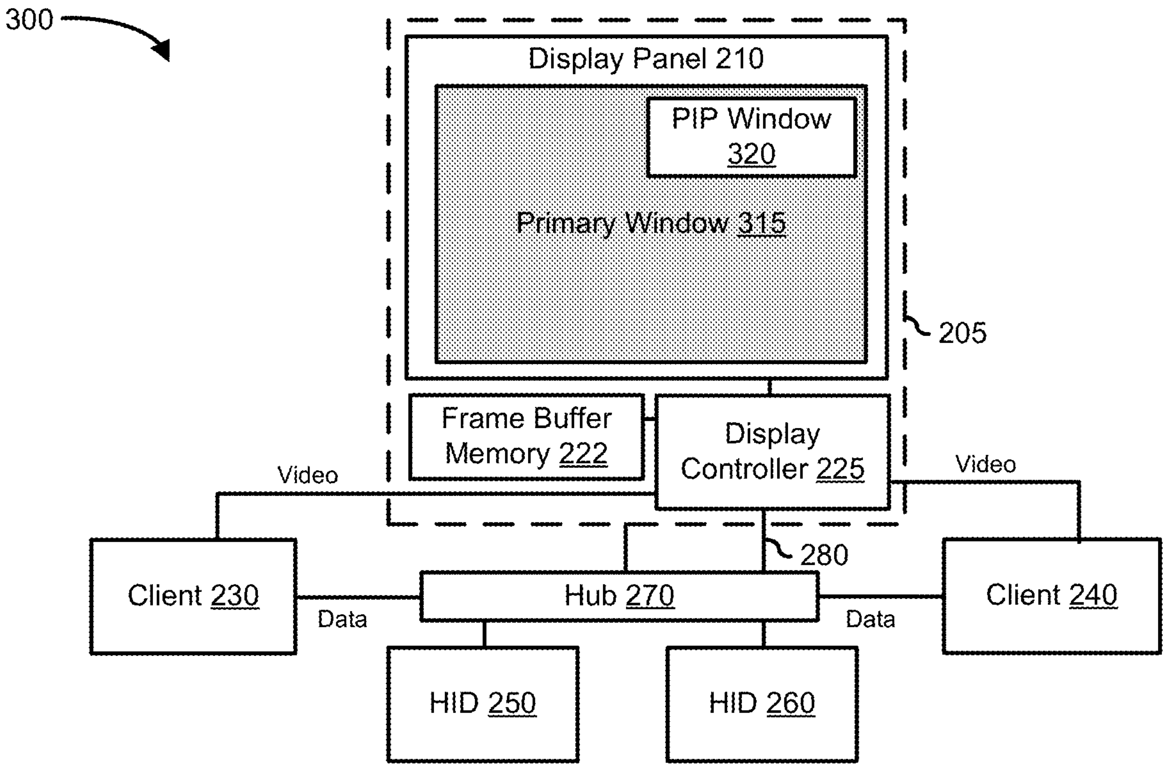

FIG. 3 shows an environment 300 with a PIP window in a defocused mode. Environment 300 includes display 205, clients 230 and 240, HID 250, and HID 260. Display 205 includes a display panel 210 which includes a primary window 315 and a PIP window 320, frame buffer memory 222 and display controller 225. Display 205 also includes frame buffer memory 222 and display controller 225. Primary window 315 is similar to primary window 215, such as both are of the same size. Primary window 215 may transition to primary window 315 when defocused or inactive. Primary window 315 may transition to primary window 215 when is focused or active.

PIP window 320 is similar to PIP window 220. However, in this example, PIP window 320 is in the defocused mode. In this mode, PIP window 320 is configured for the second size resolution which is smaller than PIP window 220. For example, PIP window 320 may be less than a quarter of primary window 315. In addition, PIP window 320 may be laid on top of primary window 315, such as in one of the corners of primary window 315. In this example, PIP window 320 is in the top right corner of primary window 315. In an alternative implementation, PIP window 320 may be completely disabled and occupy no screen area at all while it is in defocused mode, depending on user preference set in the on-screen display interface.

PIP window 220 may transition to PIP window 320 when PIP window 220 is in the defocused mode or inactive. PIP window 320 may transition to PIP window 220 when PIP window 320 is in the focused mode or activated. When PIP window 320 is in the defocused mode, one or more configuration settings may be updated. For example, PIP window 320 may have been resized to a smaller size, such as from the size of PIP window 220, and overlaid on a corner of primary window 315. In addition, PIP window 320 may be configured to be semi-transparent or translucent. One or more configuration settings of the primary window may also be updated. For example, primary window 315 may have been resized to a larger size, such as from the size of primary window 215.

Figure 4:
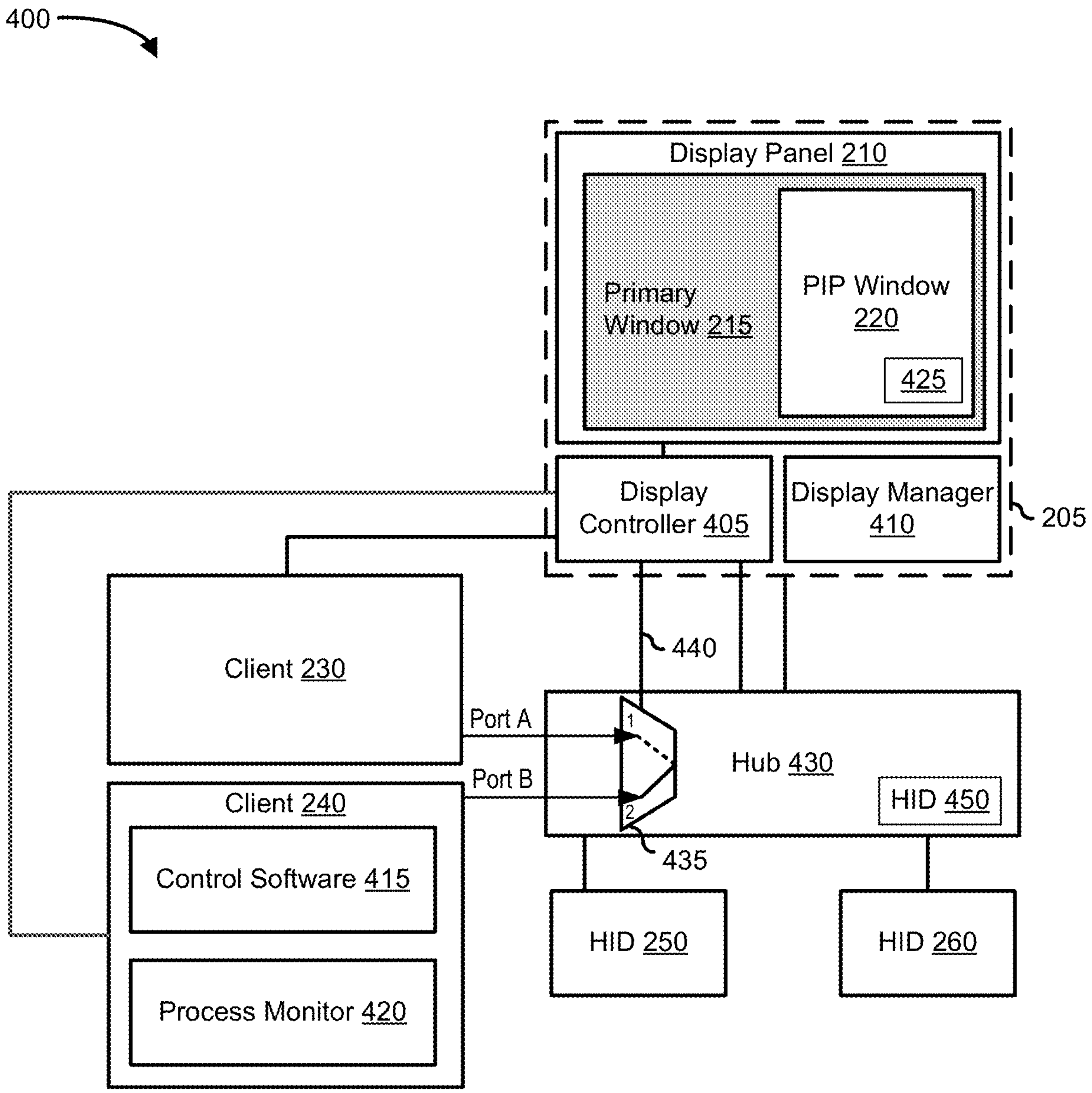

FIG. 4 shows an environment 400 with a PIP window in the focused mode. Environment 400, which is similar to environment 200, includes display 205, client 230, client 240, HID 250, HID 260, and hub 430. Display 205 includes a display panel 210 that further includes primary window 215 and PIP window 220. In this example, PIP window 220 includes a control button 425. Client 240 includes a control software 415 and a process monitor 420. Control software 415 may be associated with control button 425. Hub 430, which is similar to hub 270 of FIG. 2, may include a KVM switch 435, which is also referred to as a KVM multiplexer. KVM switch 435 may be configured to allow a user to switch between client 230 and client 240. In this example, clients 230 and 240 may be coupled to KVM switch 435 which can be communicatively coupled to hub 430. Hub 430 may in turn be communicatively coupled to HID 250 and HID 260. This allows clients 230 and 240 to use HIDs 250 and 260 depending on a polarity of KVM switch 435. KVM switch 435 may be communicatively coupled to display controller 405 via KVM control signal 440. In addition, hub 430 may be communicatively coupled to display controller 405.

Further, hub 530 may be coupled to HID 250 and HID 260. In one embodiment, the user may manually switch KVM switch 435 between client 230 and client 240 via on-screen display interface rendered by display controller 405, which in turn causes display controller 405 to change the polarity of KVM switch 435 via a KVM control signal 440. In particular, the user may connect or disconnect clients 230 and 240. In this example, client 240 is connected as indicated by a straight line in "connection 2." Accordingly, client 230 is disconnected as indicated by a dashed line in "connection 1." When connected, the client has access to input devices HID 250 and 260.

In addition, display controller 405 may be configured to detect the cable connection and disconnection event between client 230, client 240, and KVM switch 435 reported by hub 430. For example, display controller 405 may detect an event associated with the disconnection of client 240 from KVM 435, disable PIP window 220, and switch the polarity of KVM switch 435 to Port A via KVM control signal 440 automatically. Display controller 405 may adjust the configuration settings of primary window 215 and PIP window 220 based on which client is connected. For example, if client 240 is connected, then display controller 405 may set PIP window 220 to the focused mode. Accordingly, if client 240 is disconnected, then display controller 405 may set PIP window 220 to the defocused mode. Although KVM switch 435 is shown as part of hub 430, one of skill in the art will appreciate that KVM switch 435 can be an external component without affecting its functionality as disclosed herein. For example, KVM switch 435 may be a hardware device that connects one set of keyboard, monitor, and mouse to at least two information handling systems.

Display controller 405, also referred to as a scaler, may be configured to adjust the resolution of visual information received from a communication interface to fit the resolution of pixels disposed in display panel 210. In particular, display controller 405 may also be configured to adjust the resolution of the visual information from clients 230 and 240 to fit the resolution of primary window 215 and PIP window 220 respectively. Display controller 405 may be configured to automatically adjust one or more configuration settings of primary window 215 and PIP window 220 based on at least one or a combination of events. For example, display controller 405 may dynamically change PIP window 220 from a focused mode to a defocused mode or vice versa.

Control software 415, also referred to as focus/defocus control software, may include an application that is running in the background of client 240. Control software 415 may be configured to allow the user to change the mode of PIP window 320 via control button 425. Control button 425 may be located at PIP window 220, at an operating system taskbar, or at another location that is accessible to the user. Control button 425 may be similar to a toggle button, wherein the user may press control button 425 to switch PIP window 220 from focused mode to defocused mode and vice versa. Control software 415 may use different methods to send an event associated with the switch to display controller 405. For example, control software 415 may transmit a USB HID command, to a virtual HID 450 embedded in hub 430, which will in turn signal display controller 405 to switch PIP window 220 from focused mode to defocused mode. Virtual HID 450 may allow hub 430 to communicate with client 230 or client 240 via a USB interface. Alternatively, control software 415 may also communicate to display controller 405 via their connected video link, such as video electronics standards association (VESA) display data channel (DDC)/command interface (CI) command over a DisplayPort® or HDMI channel. In addition, the control function of control software 415 may be exported to an external library that can be invoked by other applications. In another embodiment, control software 415 may include a timer that automatically switches the mode of PIP window 220 from defocused mode to focused mode or vice versa. Accordingly, control software 415 may transmit a timer event to display controller 405 without user intervention.

Process monitor 420, also referred to as a process activity level monitoring software, may be used to trigger PIP window 220 to focused mode from defocused mode or vice versa. Process monitor 420 may start monitoring the CPU utilization of an application associated with the PIP window when the secondary client is set into the defocused mode. In one embodiment, process monitor 420 may transmit an event to display controller 405 which can trigger display controller 405 to change the mode of PIP window 220. In one embodiment, process monitor 420 may transmit the event based on the CPU utilization. In this embodiment, process monitor 420 may be configured to monitor the CPU utilization level of client 240 or an application associated with PIP window 220. In one embodiment, process monitor 420 may automatically start monitoring the CPU utilization level when PIP window 220 is initiated when client 240 is powered on or connected to hub 430. Once the CPU utilization level drops below a pre-defined threshold, process monitor 420 would send an event to display controller 405 to trigger PIP window 220 to the focused or defocused mode. For example, process monitor 420 may transmit the event via the VESA DDC/CI command.

Display manager 410 may be configured to receive user input via an on-screen display to manage the operation of primary window 215 and PIP window 220. Display manager 410 may be continuously running in the background and executed by an operating system of clients 230 or 240. In particular, display manager 410 may be used by a user to manage and control, such as to determine whether the PIP window is to be put in focused mode, defocused mode, or off mode. In particular, a user may update the policies, such add, edit, or remove an event or user activity that may trigger the change in the mode of the PIP window. For example, display manager 410 may adjust the configuration settings of primary window 215 and PIP window 220 with display controller 405 based on one or more policies.

The policies may be stored in a non-volatile storage device. In one example, display manager 410 may be used to arrange the layout of primary window 215 and PIP window 220. For example, the user may adjust the size and resolution of primary window 215 and PIP window 220 when in the focused mode and the defocused mode. In addition, the user may configure and/or update the policies associated with the focused and defocused modes via display manager 410. For example, the policies may provide rules on how an event or combination of events may affect the state of primary window 215 and/or PIP window 220 as depicted in a state diagram 600 of FIG. 6.

Figure 5:
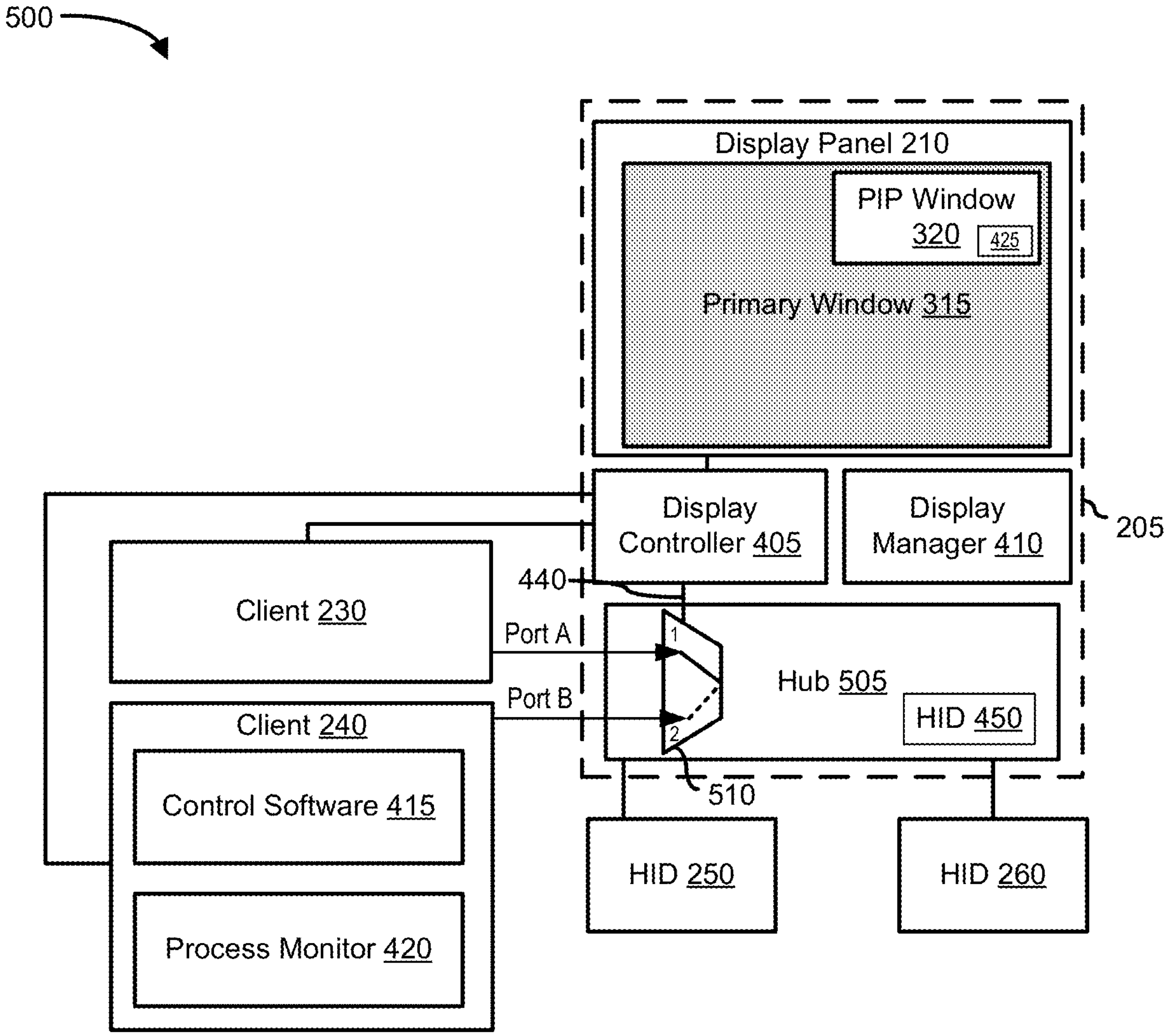

FIG. 5 shows an environment 500 with a PIP window in a defocused mode. Environment 500, which is similar to environment 400, includes display 205, client 230, client 240, HID 250, HID 260, and hub 505. Display 205 includes a display panel 210 that further includes primary window 315 and PIP window 320. In this example, PIP window 320 includes control button 425. Client 240 includes control software 415 and process monitor 420. Control software 415 may be associated with control button 425. In this example, display 205 also includes hub 505 which is similar to hub 430 of FIG. 4. However, instead of being external to display 205, hub 505 may be integrated to display 205. In this example, hub 505 includes a KVM switch 510, which is similar to KVM switch 435. Accordingly, KVM switch 510 may be configured to allow a user to switch between client 230 and client 240. In this example, client 230 is connected to display 205 via port A as indicated by a straight line 1 in KVM switch 510. Thus, client 240 is not connected to display 205 via port B as indicated by a straight line 2 in KVM switch 510. Accordingly, PIP window 320 is in a defocused mode.

Those of ordinary skill in the art will appreciate that the configuration, hardware, and/or software components of the environments depicted above may vary. For example, the illustrative components within the environments are not intended to be exhaustive but rather are representative to highlight components that can be utilized to implement aspects of the present disclosure. For example, other devices and/or components may be used in addition to or in place of the devices/components depicted. The depicted examples do not convey or imply any architectural or other limitations with respect to the presently described embodiments and/or the general disclosure. In the discussion of the figures, reference may also be made to components illustrated in other figures for continuity of the description. In addition, the components may be implemented in hardware, software, firmware, or any combination thereof. Further, the components shown are not drawn to scale and the environments may include additional or fewer components. Also, connections between components may be omitted for descriptive clarity.

Figure 6:
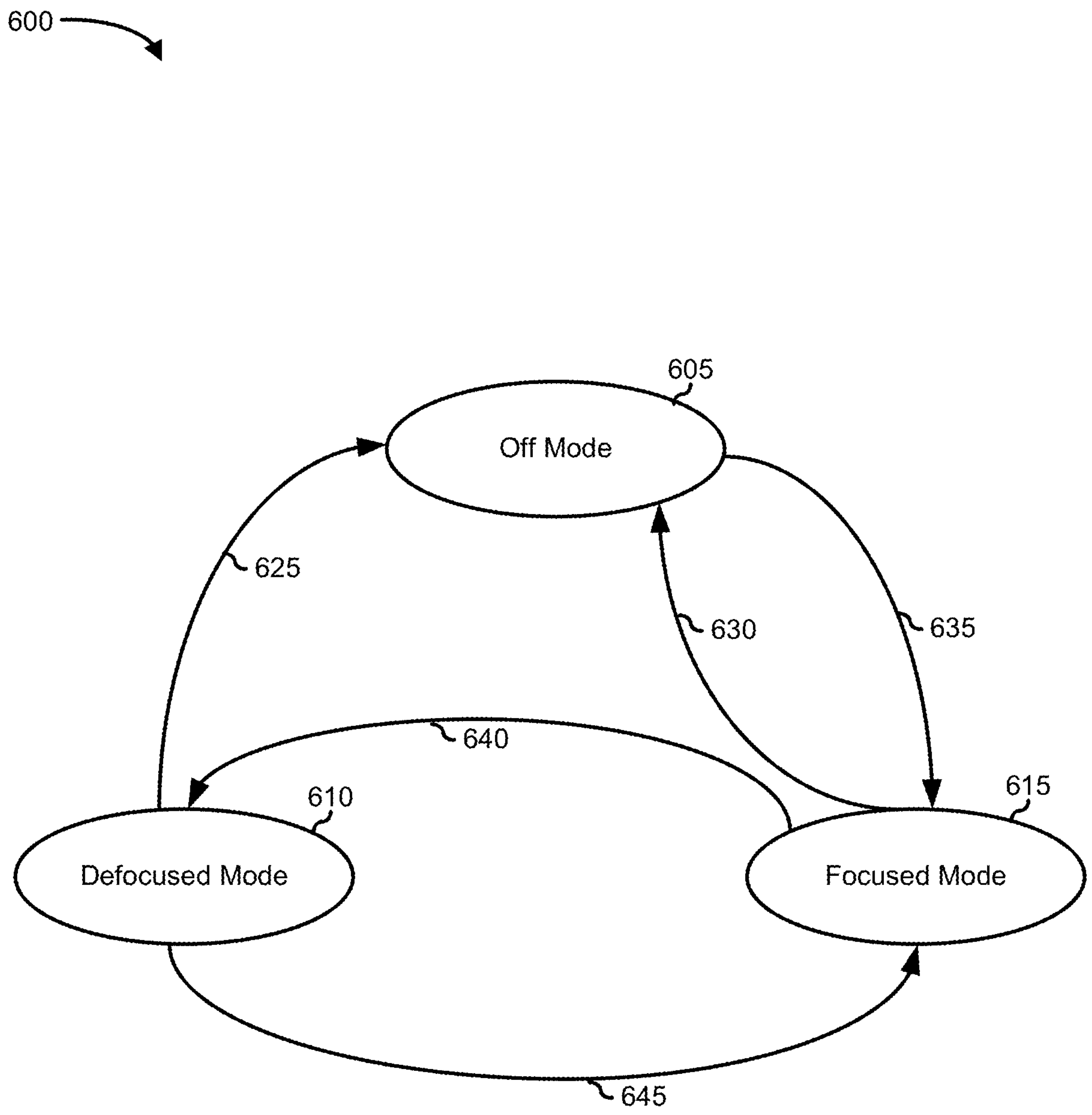
FIG. 6 is a state transition diagram for dynamic focusing/defocusing of a picture-in-picture window, according to an embodiment of the present disclosure.

FIG. 6 shows state diagram 600 which corresponds to focusing and defocusing of a PIP window. State diagram 600 includes several states of a PIP window, such as states 605, 610, and 615. State diagram 600 also includes transitions 625, 630, 635, 640, and 645. State 605, which is typically an initial state of state diagram 600, represents a state wherein the PIP window is off and not visible in a display. The PIP window can be at state 605 when a secondary client associated with the PIP window is powered off or not connected to a hub or a display. For example, the PIP window may be in at state 605 if there is zero volts at a connector pin 20 of a DisplayPort® coupled to the secondary client. The PIP window may also be in state 605 if there is zero volts at connector pin 18 of an HDMI cable coupled to the secondary client. In another example, the PIP window can be at state 605 when a USB Power Delivery Alert Data Object and/or Extended Message Type indicating that the secondary client is at an S0ix, S3, S4, or S5 power state is received from a USB type-C interface that is coupled to the secondary client.

State 605 may transition to state 615 via transition 635, wherein state 615 may represent the PIP window in the focused mode. The focused mode is associated with at least one configuration setting of the PIP window. For example, when in the focused mode, the size of the PIP window may be at the first size resolution which is similar to PIP window 220 of FIG. 2. In addition, when the PIP window is in the focused mode, one or more configuration settings of a primary window may also be updated. For example, when the PIP window is in the focused mode, the size of the primary window may be similar to primary window 215 of FIG. 2. In addition, the opacity of the PIP window may be restored.

Transition 635 may be triggered by an event associated with a transition to a working state or S0 power state of the secondary client. The event may vary based on the type of connector used to connect the secondary client to the display. For example, the display controller may receive a USB Power Delivery Alert Data Object and/or an Extended Message Type indicating the transition to the S0 power state of the secondary client from the USB type-C connector. The display controller may also receive an event that indicates that 3.3 volts is detected at connector pin 20 of the DisplayPort® connector coupled to the secondary client. In another example, the display controller may receive an event that indicates that 5 volts is detected at pin 18 of an HDMI connector coupled to the secondary client.

State 615 may transition to state 605 via transition 630. Transition 630 may be triggered by an event or user activity associated with the PIP window going into the off mode, such as when the secondary client is powered down or disconnected from the display. For example, the event may be a receipt of a USB Power Delivery Alert Data Object and/or an Extended Message Type indicating the transition to the S0ix, S3, S4, or S5 power state of the secondary client from a USB type-C connector coupled to the secondary client. In another example, the event may be detecting zero volts at connector pin 20 of the DisplayPort® connector coupled to the secondary client. In another example, the event may be detecting zero volts at pin 18 of an HDMI connector that is coupled to the secondary client.

State 615 may transition to state 610 via transition 640. State 610 may represent a PIP window in the defocused mode. The defocused mode is associated with at least one configuration setting of the PIP window. For example, when in the defocused mode, the size of the PIP window may be at the second size resolution similar to PIP window 320 of FIG. 3. During the defocused mode, one or more configuration settings of a primary window may also be updated. When the PIP window is in the defocused mode, the size of the primary window may be similar to primary window 315 of FIG. 3. The PIP window may be overlaid on the primary window. In addition, the transparency of the PIP window may be increased such that it may become transparent, semi-transparent, or translucent which allows the user to view images behind the PIP window.

Transition 640 may be triggered by an event or user activity associated with a power state and/or process activity of the secondary client. For example, transition 640 may be triggered by a user putting the PIP window to the defocused mode, such as by pressing a control button similar to control button 425 of FIG. 4. In addition, transition 640 may be triggered by a timeout event that automatically switches the PIP window from the focused mode to the defocused mode based on a pre-defined period. Further, transition 640 may be triggered by an event that is generated when the user changes the polarity of the KVM switch from client 240 to client 230 via the on-screen display interface.

State 610 may transition to state 615 via transition 645. Transition 645 may be triggered by an event or user activity associated with a power state and/or process activity of the secondary client. For example, transition 645 may be triggered by an event associated with a user putting the PIP window to the focused mode, such as by pressing a control button similar to control button 425 of FIG. 4. In addition, transition 645 may be triggered by a timeout event that automatically switches the PIP window from the defocused mode to the focused mode based on a pre-defined period. Further, transition 645 may be triggered by an event that is generated when an input device that is coupled to a KVM switch is connected to the secondary client. For example, the event may be generated when a user switches from using the client 230 to using the client 240 which connects the HID 250 or HID 260 to client 240 of FIG. 2. In another example, transition 645 may be triggered by an event that is generated by a process monitor, which is similar to process monitor 420 of FIG. 4, when CPU utilization of an application drops below a pre-defined threshold.

State 610 may transition to state 605 via transition 625. Transition 625 may be triggered by an event or user activity associated with a power state and/or process activity of the secondary client. Transition 625 may be triggered by an event or user activity associated with a transition to the off mode by the PIP window, such as the secondary client being powered down or disconnected from the display. For example, the event may be a receipt of a USB Power Delivery Alert Data Object and/or an Extended Message Type from the USB type-C connector indicating the transition to the S0ix, S3, S4, or S5 power state of the secondary client. The event may also be a receipt of an event that indicates that zero volts is detected at connector pin 20 of the DisplayPort® connector which is coupled to the secondary client. In another example, the event may be a receipt of an event that indicates that zero volts is detected at pin 18 of an HDMI connector which is coupled to the secondary client.

Those skilled in the art will recognize that although the PIP window is associated with two modes, wherein each mode is associated with a different size of the PIP window, the PIP window may be associated with more than two modes and more than two sizes. For example, in addition to being associated with the defocused mode, the PIP window may be associated with a first-focused mode and a second-focused mode, wherein the size of the PIP window associated with the first-focused mode is different than the size of the PIP window associated with the second focused mode.

Figure 7:
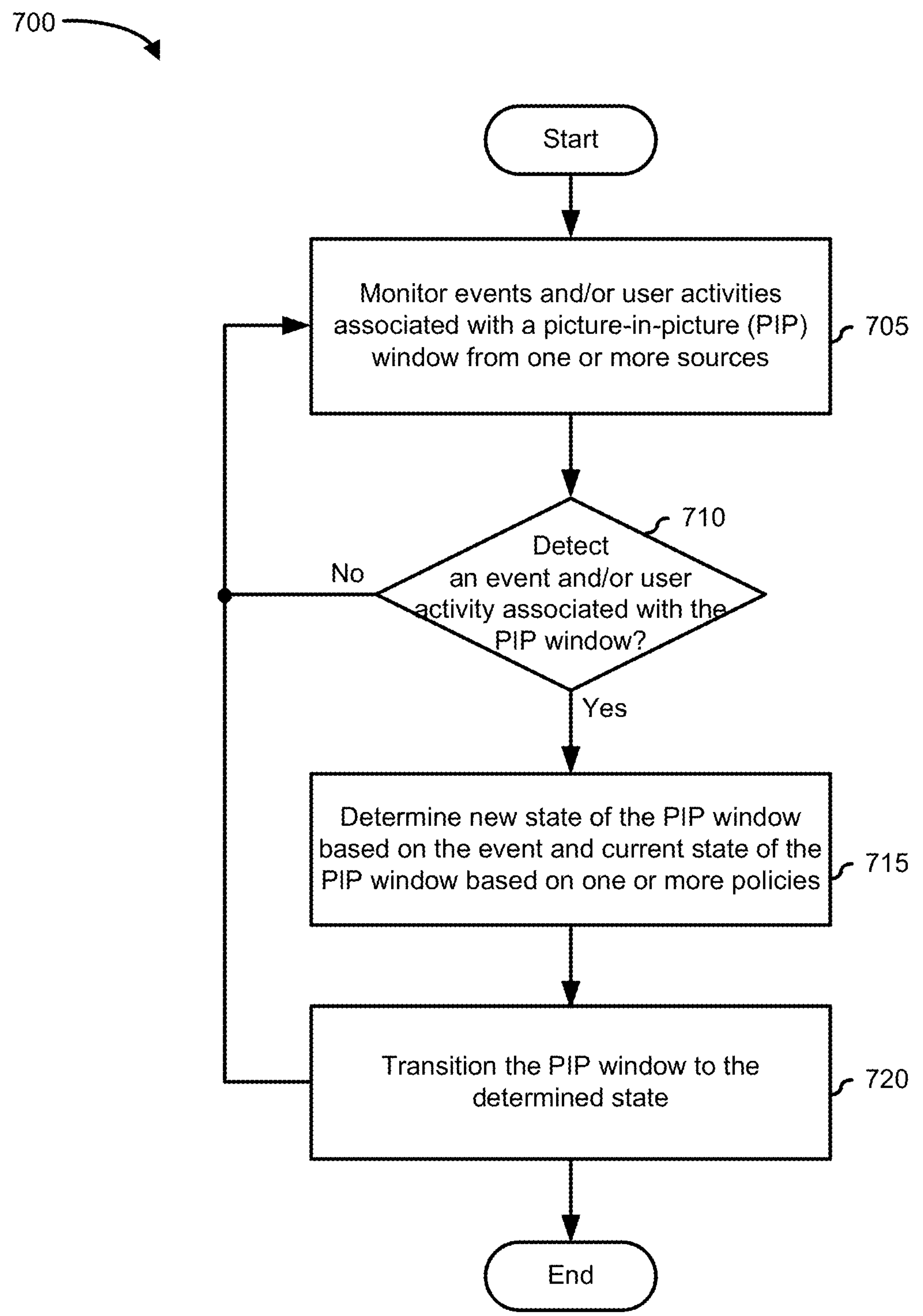
FIG. 7 is a flowchart of a method for dynamic focusing/defocusing of a picture-in-picture window, according to an embodiment of the present disclosure.

FIG. 7 shows a flowchart of a method 700 for dynamically focusing or defocusing a PIP window. Method 700 may be performed by one or more components of environment 400 of FIG. 4 and environment 500 of FIG. 5. In particular, method 700 may be performed by a display controller which is similar to display controller 405 of FIG. 4. However, while embodiments of the present disclosure are described in terms of environment 400 of FIG. 4 and environment 500 of FIG. 5, it should be recognized that other systems may be utilized to perform the described method.

Method 700 typically starts at block 705 where the display controller monitors events and/or user activities associated with a PIP window from one or more sources, such as a KVM switch, input device, control software process monitor software, etc. The method may proceed to decision block 710 where the display controller determines whether it detects an event and/or user activity associated with the PIP window. If the display controller detects an event and/or user activity, then the “YES” branch is taken, and the method proceeds to block 715. If the display controller does not detect an event and/or user activity, then the “NO” branch is taken, and the method loops back to block 705.

At block 715, the display controller may determine a new state of the PIP window based on the detected event and/or user activity with a current state of the PIP window, such as depicted in state diagram 600 of FIG. 6. The display controller may use one or more policies for the determination. Each policy may include one or more rules to dynamically change the state of the PIP window and/or the primary window. The policies and/or the rules may be defined at manufacture and/or by a user. In some implementations, the policies and/or rules may be improved upon by machine learning and/or artificial intelligence algorithms.

For example, based on a policy, the new state of the PIP window may be determined to be in a defocused mode in response to detecting one of the following events, with no change in preferred timing from a focused mode: a) the KVM switch is disconnected from a client associated with the PIP window, b) the KVM switch is connected to a client associated with a primary window, and c) receipt of a defocus signal from a control software of the client associated with the PIP window.

In another example, based on a policy, the new state of the PIP window may be determined to be in a focused mode in response to detecting one or the following events, with no change in preferred timing from a defocused mode: a) the KVM switch is connected to a client associated with the PIP window, b) the KVM switch is disconnected from a primary client, c) receipt of a focus signal from a control software of the client associated with the PIP window, and d) a change in with the secondary client’s power state. After determining the new state of the PIP window, the method may proceed to block 720. At block 720, the configuration settings of the PIP window and/or the primary window may be updated based on the new state of the PIP window.

FIG. 8 shows a table 800 depicting a change in the PIP window’s state based on a secondary client’s power state. Table 800 shows a change in whether the PIP window is enabled or disabled. In this example, enabling the PIP window includes putting the PIP window in a focused mode while disabling the PIP window represents putting the PIP window in an off mode. In one example, the PIP window may be disabled when zero volts is detected at pin 20 of the DisplayPort® connector from a previous state of 3.3 volts, wherein the DisplayPort® connector is coupled to a secondary client. Accordingly, the PIP window may be enabled when 3.3 volts is detected at the same connector pin from a previous state of zero volts.

In another example, the PIP window may be disabled when zero volts is detected at pin 18 of an HDMI connector from a previous state of 5 volts, wherein the HDMI connector is coupled to a secondary client. Accordingly, the PIP window may be enabled when 5 volts is detected at the same connector pin from a previous state of zero volts. In yet another example, the PIP window may be disabled when a USB Power Delivery Alert Data Object a USB type-C connector is received, wherein the Alert Data Object indicates that a secondary client associated with the PIP window is at an S0ix, S3, S4, or S5 power state from an S0 power state. Accordingly, the PIP window may be enabled with a USB Power Delivery Alert Data Object from a USB type-C connector is received, wherein the Alert Data Object indicates that a secondary client associated with the PIP window is at an S0 power state from an S0ix, S3, S4, or S5 power state.

Although FIG. 7 show example blocks of method 700 in some implementation, method 700 may include additional blocks, fewer blocks, different blocks, or differently arranged blocks than those depicted in FIG. 7. Those skilled in the art will understand that the principles presented herein may be implemented in any suitably arranged processing system. Additionally, or alternatively, two or more of the blocks of method 700 may be performed in parallel. For example, block 705 and decision block 710 of method 700 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:

detecting, by a processor of a display device, an event associated with a picture-in-picture window associated with a first information handling system, wherein the display device includes a primary window associated with a second information handling system, wherein the first information handling system is discrete from the second information handling system, wherein the event is triggered based on a central processing unit utilization level;

in response to detecting the event, determining a new state of the picture-in-picture window based on the event and a current state of the picture-in-picture window; and resizing the picture-in-picture window from a first size resolution to a second size resolution based on the new state, and wherein the picture-in-picture window is disposed proximate to the primary window; and altering transparency of the picture-in-picture window from a first transparency to a second transparency based on size of the picture-in-picture window, wherein the first transparency is associated with the first size resolution and the second transparency is associated with the second size resolution.

2. The method of claim 1, wherein the primary window is of a same size whether the picture-in-picture window is in the current state or in the new state.

3. The method of claim 1, wherein the event is in response to a user pressing a control button.

4. The method of claim 1, wherein the event is triggered in response to detecting that the first information handling system is powered on.

5. The method of claim 1, wherein the event is triggered in response to detecting that the first information handling system is powered off.

6. The method of claim 1, wherein the picture-in-picture window is transparent when in a defocused mode.

7. The method of claim 1, wherein the event is triggered based on a policy configured by a user.

8. The method of claim 1, wherein the event is triggered by a timeout setting.

9. An information handling system, comprising:

a processor; and a memory storing instructions that when executed cause the processor to perform operations including:

detecting by a display device, an event associated with a picture-in-picture window associated with the information handling system, wherein the display device includes a primary window associated with another information handling system, wherein the information handling system is discrete from the other information handling system, wherein the event is triggered based on a central processing unit utilization level;

in response to detecting the event, determining a new state of the picture-in-picture window based on the event and a current state of the picture-in-picture window;

resizing the picture-in-picture window from a first size resolution to a second size resolution based on the new state, and wherein the picture-in-picture window is disposed proximate to the primary window; and altering transparency of the picture-in-picture window from a first transparency to a second transparency based on size of the picture-in-picture window, wherein the first transparency is associated with the first size resolution and the second transparency is associated with the second size resolution.

10. The information handling system of claim 9, wherein the primary window is of a same size whether picture-in-picture window is in the current state or in the new state.

11. The information handling system of claim 9, wherein the event is in response to a user pressing a control button.

12. The information handling system of claim 9, wherein the event is triggered in response to detecting that the information handling system is powered off.

13. The information handling system of claim 9, wherein the picture-in-picture window is transparent when in a defocused mode.

14. A non-transitory computer-readable medium to store instructions that are executable to perform operations comprising:

detecting by a display device, an event associated with a picture-in-picture window associated with a first information handling system, wherein the display device includes a primary window associated with a second information handling system, wherein the first information handling system is discrete from the second information handling system, wherein the event is triggered based on a central processing unit utilization level;

in response to detecting the event, determining a new state of the picture-in-picture window based on the event and a current state of the picture-in-picture window;

resizing the picture-in-picture window from a first size resolution to a second size resolution based on the new state, and wherein the picture-in-picture window is disposed proximate to the primary window; and altering transparency of the picture-in-picture window from a first transparency to a second transparency based on size of the picture-in-picture window, wherein the first transparency is associated with the first size resolution and the second transparency is associated with the second size resolution.

15. The non-transitory computer-readable medium of claim 14, wherein the primary window is of a same size whether picture-in-picture window is in the current state or in the new state.

16. The non-transitory computer-readable medium of claim 14, wherein the event is in response to a user pressing a control button.

17. The non-transitory computer-readable medium of claim 14, wherein the event is triggered in response to detecting that the first information handling system is powered on.

* * * * *